United States Patent
Miller

[15] 3,669,841
[45] June 13, 1972

[54] ATTACHMENT OF ENZYMES TO SILICEOUS MATERIALS

[72] Inventor: Robert E. Miller, Ballwin, Mo.
[73] Assignee: Monsanto Company, St. Louis, Mo.
[22] Filed: Feb. 11, 1970
[21] Appl. No.: 10,654

[52] U.S. Cl. .......................... 195/63, 195/DIG. 11, 195/68
[51] Int. Cl. ........................................ C12k 1/00, C07g 7/02
[58] Field of Search ............................... 195/63, 63 P, 68, 66

[56] References Cited

UNITED STATES PATENTS 3,519,538   7/1970   Messing et al. ........................... 195/63
3,502,545   3/1970   Westman et al. ......................... 195/66

OTHER PUBLICATIONS

Habeeb, A.F.S.A., Preparation of Enzymically Active, Water–Insoluble Derivatives of Trypsin, Archives of Biochemistry and Biophysics, 1967, Vol. 119 (pp. 264– 268) QD501A77.

Ogata et al., Preparation of Water–Insoluble, Enzymatically Active Derivatives of Subtilisin Type Novo by Gross–Linking with Glutataldehyde, Biochem. Biophys. Acta., 2, 1968 Vol. 159 (pp. 403– 405) QD185

Habeeb, A.F.S.A. Antigenicity of Formaldehyde and Glutaraldehyde–Bovine Setum Albumin and Ovalbumin–Bovine Setum Albumin Conjugate, Chemical Abstracts, Vol. 70 1969 (p. 182) QD1A51C2.

Truce, et al., Stereochemistry of Amine Additions to Acetylenic Sulfones and Carboxylic Esters, J. Org. Chem. 31(11) 1966 (pp. 3543–3550) QD241J6.

*Primary Examiner*—A. Louis Monacell
*Assistant Examiner*—D. M. Naff
*Attorney*—Gordon W. Hueschen and Talivaldis Cepuritis

[57] ABSTRACT

Enzymes are attached to siliceous materials by silation of the siliceous material to introduce functional groups which are then linked to an enzyme by means of crosslinking agents. The products are enzymatically active heavy-duty composites in which the enzyme is covalently attached via the crosslinking agent and an organosilane to the siliceous material.

21 Claims, No Drawings

ATTACHMENT OF ENZYMES TO SILICEOUS MATERIALS

BACKGROUND OF THE INVENTION

1. Field of Invention

Enzymes—insolubilized by attachment to siliceous material.

2. Prior Art

The various activities and utilities of enzymes are extremely well established and documented. The enzymes are protein in nature and are water-soluble, so that their employment is also attended by loss or "using up" of the enzyme. Recently, attempts have been made to prolong the activity of enzymes and to render them insoluble, and thus suitable for recovery and reuse, by attachment of the enzymes to various organic polymers. Such efforts have met with greater or lesser degrees of success, but such approach is seriously handicapped by the high cost of organic materials suggested for combination with the enzymes to produce an insoluble product. It would be highly desirable to have available insoluble long-acting and reusable forms of enzymes which did not suffer from the disadvantage of high cost. It would also be advantageous to have such enzymatically-active materials available in a particulate form which would permit ready contact of the substrate with the insolubilized enzyme. Enzymatically-active materials having the foregoing enumerated advantages are provided by the present invention.

Accordingly, it is an object of this invention to provide insoluble, enzymatically-active composites. The provision of a process for the production of such composites is a further object of the invention. Still other objects will become apparent hereinafter upon reference to the ensuing specification and claims.

SUMMARY OF THE INVENTION

The present invention provides insoluble, heavy-duty enzymatically-active composites wherein an enzyme moiety is linked to a siliceous carrier by means of a crosslinking agent such as an aldehyde, a disulfonyl halide, or a bispropiolate and an organosilane. The obtained products are insoluble, reusable, long-acting enzymatically-active composites in which the enzyme is covalently bound. Such enzymatically-active materials can be conveniently provided in particulate form to facilitate rapid and complete contact of the active enzyme with the substrate upon which enzymatic action is desired.

DESCRIPTION OF THE PREFERRED EMBODIMENTS

Siliceous materials that can be utilized for the preparation of the composites of this invention include granulated or fibrous silica and silicates such as sand, glass cloth, fibers, matting, and the like, asbestos, diatomaceous earth, wollastonite, fosterite, feldspar, mullite, various clays including bentonite, kaolin, etc. The principal requirement of the siliceous material is that surface hydroxyl groups be present which are reactive with hydrolyzable groups on an organosilane which acts as a coupling agent.

The siliceous material can be reacted with the organosilane in any convenient manner by contacting the former with the latter to obtain the desired bonding through hydrolyzable groups of the organosilane. Usually the organosilane is dissolved in an inert solvent such as toluene, xylene, or the like, and the resulting solution is then applied to the siliceous material. Aqueous solutions of the silane can also be used.

The amount of organosilane coupling agent employed is dependent upon the nature and surface area of the siliceous material. Usually, at least about 0.01 percent by weight of the organosilane, based on the weight of the siliceous material, is desired. Amounts in the range from about 0.25 to about 2.01 percent by weight are preferred.

Suitable organosilanes are substituted organosilanes which can be represented by the formula

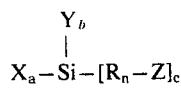

where X is a hydrolyzable group capable of reacting with a hydroxyl group, Y is hydrogen or monovalent hydrocarbon group, R is alkylene group having from 1 to about 20 carbon atoms, Z is a functional group capable of reacting with a crosslinking agent, n is an integer having a value of 0 or 1, $a$ is an integer having a value of 1 to 3, inclusive, $b$ is an integer having a value 0 to 2, inclusive, $c$ is an integer having a value of 1 to 3, inclusive, and the sum of $a + b + c$ equals 4.

Examples of suitable X groups include halo, hydroxy, alkoxy, cycloalkoxy, aryloxy, alkoxy-substituted alkoxy such as β-methoxyethoxy or the like, alkoxycarbonyl, aryloxycarbonyl, alkyl carboxylate, and aryl carboxylate groups, preferably having eight or less carbon atoms.

Examples of suitable Y groups in the above formula are hydrogen, methyl, ethyl, vinyl, isobutyl, and other hydrocarbyl groups, preferably having 10 or less carbon atoms.

The R group in the above formula can be any alkylene group having up to about 20 carbon atoms, and preferably from about 2 to about 18 carbon atoms. Examples of such groups are ethylene, the propylenes, the butylenes, the decylenes, the undecylenes, the octadecylenes, and the like.

The Z groups can be any functional group capable of reacting with the hereinbelow defined crosslinking agent. Examples of such groups are amino, primary and secondary amido, epoxy, isocyanato, hydroxy, alkoxycarbonyl, aryloxycarbonyl, vinyl, allyl, halo such as chloro or bromo, and the like.

Particularly preferred of such functional groups are amino.

Particularly preferred organosilanes for the purposes of this invention are omega-aminoalkyl- and aminoaryltrialkoxysilanes such as gamma-aminopropyltrimethoxysilane, aminophenyltriethoxysilane, and the like.

The active enzyme may be obtained from any suitable source, either vegetable, animal, or microbial. Many such enzymes are available commercially. Typical are the proteases, e.g., acid and/or neutral and/or alkaline protease. In some instances another, differently active enzyme such as amylase for example, can be admixed therewith to maximize the operative enzyme activity of the composite. Still other enzymes such as a lipase or cellulase may be used instead of or in addition to the amylase. Additional suitable enzymes are carbohydrase, lipase, esterase, nuclease, or other types of hydrolase. A hydrase, oxidoreductase, or demolase may also be employed, or a transferase or isomerase, depending upon the ultimate activity and application intended.

Many such enzymes can conveniently be obtained from microorganisms which include bacteria, yeasts, fungi and the like by using well-known fermentation methods such as those generally described in KIRK-OTHMER, Encyclopedia of Chemical Technology *8*, 173-204, and a great many microbially-produced enzymes are available commercially.

The exact activity of the enzyme or enzymes employed as starting material depends on the exact method of preparation and is not critical to the present invention providing only that the enzymatically active composite produced therefrom has the desired enzymatic activity. Various analytical methods are available to determine the activity of enzymatically active material, for example, the protease activity of proteolytic enzymes can be determined by well-known casein digestion methods. According to such tests, a protease catalyzes the hydrolysis of casein for a certain period of time and temperature and at a certain pH; the reaction is stopped by the addition of trichloroacetic acid, and the solution is filtered. The color of the filtrate is developed by Folin phenol reagent, and the level of enzyme activity is measured spectrophotometrically in units of casein tyrosine. This method is more fully described in the Journal of General Physiology *30*, 291 (1947) and in Methods of Enzymology *2*, 33, Academic Press N.Y. (1955). Amylase activity is generally determined by the well-known dinitrosalicylic acid method of Bernfeld. Still other test procedures are known in the art and some are set forth hereinafter.

A particularly effective source of mixed enzymes which can be used as starting material in the present invention is a mutated *Bacillus subtilis* organism. The process for producing this organism and enzymes therefrom is described in U.S. Pat. No. 3,031,380. A culture of this *Bacillus subtilis* (strain AM) organism has been deposited with the U.S. Department of Agriculture, Agricultural Research Service, Northern Utilization Research and Development Division, 1815 North University Street, Peoria, Illinois 61604, and has been assigned No. NRRL B-3411. The enzymatically active material produced by this organism has been found generally to consist of two proteases, approximately 65–75 percent neutral protease (activity at a pH of 7.0–7.5) and about 25–35 percent alkaline protease (activity at a pH of 9 to 10). A significant amount of amylase is also present. There are generally about 700,000 to about 1.2 million units of neutral protease activity per gram of isolated solids and about 250,000 to about 400,000 units of alkaline protease activity per gram as determined by Anson's Variation of the Kunitz "Casein" method. There are generally about 300,000 to 350,000 units of amylase activity per gram as determined by the Bernfeld method. As pointed out in the cited patent, the relative proportions of protease to amylase will vary depending on the exact conditions of growth of the microorganism, but it has been found that the neutral and alkaline protease and the amylase will be produced, in at least some amounts, almost regardless of changes in the culture medium and other conditions of growth of the microorganism.

Another source of mixed enzymes which can be used as starting material in accord with the present invention is *B. subtilis* strain NRRL 644, *B. subtilis* strain NRRL 941, and *B. subtilis* strain IAM 1523 (Japanese Culture Collection). Still other *B. subtilis* microorganisms are available which produce protease, a mixture of proteases, or protease and amylase, at least to a limited if not optimum extent. The so-called *Streptomyces griseus* neutral protease has a broad pH activity range and may constitute one starting enzyme for incorporation into the composites of this invention.

Other typical enzymes are trypsin, chymotrypsin, pepsin, papain, carboxypeptidase, rennin, and the like.

In order to bring about the desired bonding between the enzyme and the organosilane a crosslinking agent is employed which forms a covalent bond with a reactive group on the enzyme molecule not essential to enzyme activity, and also which forms a covalent bond with a functional group of the organosilane.

For the purposes of this invention suitable crosslinking agents are formaldehyde, unsaturated monoaldehydes, preferably containing up to about 4 carbon atoms, and dialdehydes, bispropiolates, and disulfonyl halides.

Illustrative unsaturated monoaldehydes are the $\alpha,\beta$-unsaturated aldehydes such as acrolein, crotonaldehyde, vinylacetaldehyde, and the like.

Illustrative dialdehydes are glyoxal, glutaraldehyde, malonic aldehyde, succindialdehyde, and the like, preferably containing from 2 to 8 carbon atoms, inclusive.

Illustrative bispropiolates are the diol propiolates such as ethylene glycol bispropiolate, propylene glycol bispropiolate, butylene glycol bispropiolate, hexamethylene glycol bispropiolate, decamethylene glycol bispropiolate, cyclohexylene glycol bis-propiolate, methylolpropane diol bispropiolate, and the like, as well as bisphenol A propiolate, pentaerythritol bispropiolate, and the like.

Illustrative disulfonyl halides are benzene-1,3-disulfonyl chloride, naphthalene-1,5-disulfonylchloride, naphthalene-1,6-disulfonylchloride, naphthalene-2,5-sulfonylchloride, and the like.

The amount of crosslinking agent present is dependent principally on the amount of enzyme or enzymes that is desired to be incorporated into the composite. Usually an enzyme-crosslinking agent molal ratio is about 1:1 or less. A ratio of about 0.01–0.0001/.0 is preferred.

The bonding of the enzyme, the crosslinking agent, and the organosilane, which is present together with the siliceous material, can be carried out in any convenient inert medium, usually an aqueous medium at pH conditions and temperature which do not tend to inactivate the enzyme. Temperatures above about 60° C. should generally be avoided. The present process is readily carried out at ambient room temperature. The temperature of choice depends, however, mainly on the particular enzyme or mixture of enzymes used. Usually the temperature can range from about −5° C. to about 30° C. A temperature in the range from about 0° C. to about 10° C. is preferred.

The composites of this invention and a process for preparing these composites are further illustrated by the following examples in which a commercially available *B. subtilis* enzyme mixture containing neutral protease ($1.27 \times 10^6$ units/gram), alkaline protease ($0.30 \times 10^6$ units/gram), and amylase ($0.31 \times 10^6$ units/gram) was utilized in preparing insoluble enzymatically-active composites.

Example 1: Enzyme Bonding on Silica

Particulate silica (2.5 grams) was slurried in distilled water (100 milliliters) and gamma-aminopropyltrimethoxysilane (0.050 grams) added thereto. The slurry was then stirred for 25 minutes at about room temperature.

A *B. subtilis* enzyme mixture (0.25 grams) was then added to the stirred slurry and thereafter a 35 weight percent aqueous formaldehyde solution (2.0 milliliters), and the stirring continued for one half hour at about room temperature. The pH of the resulting mixture was observed to be 6.75. The mixture was then filtered and washed with a 300-milliliter aliquot of an aqueous 0.1 weight percent calcium acetate solution, and the recovered solids transferred to a flask and lyophilized.

Protease activity of the lyophilized solids was found to be approximately 500 to 1,000 units per gram.

Example 2: Enzyme Bonding on Wollastonite

In a manner similar to Example 1, Wollastonite (5.03 grams) treated with gamma-aminopropyltrimethoxysilane (0.25 weight percent, based on wollastonite) was slurried in distilled water (100 milliliters). To the obtained slurry was added *B. subtilis* enzyme mixture (2.03 grams) and one drop of ethylene glycol bispropiolate, and the resulting mixture stirred at about 4° C. for 24 hours. The pH of this mixture was observed to be 6.0 to 6.5.

Thereafter the mixture was centrifuged, the recovered solids washed with water (100 milliliters) for 48 hours, and then again centrifuged and lyophilized.

Protease activity of the lyophilized solids in two assays was found to be 405 units per gram and 420 units per gram, respectively.

Example 3: Enzyme Bonding on Calcium Silicate

Calcium silicate (5.0 grams), dry coupled with 0.25 weight percent gamma-aminopropyltrimethoxysilane, was slurried in water (50 milliliters), and *B. subtilis* enzyme mixture (1.5 grams) was added to the slurry. The pH of the slurry was adjusted to 8.0 and a 25 weight percent aqueous glutaraldehyde solution (5.0 milliliters) was added thereto.

The resulting admixture was stirred at 4° C. for about 16 hours and the pH thereof was monitored frequently and maintained at 8.0 to 8.5 Thereafter the admixture was centrifuged and the recovered solids washed in 100 milliliters of water for 6 hours at 4° C. The washed solids were then recovered by centrifugation and lyophilized.

Protease activity of the lyophilized solids was found to be 1,000 to 2,000 units per gram.

Example 4: Enzyme Bonding on Calcium Silicate

Calcium silicate (5.36 grams), dry coupled with 0.25 weight percent gamma-aminopropyltrimethoxysilane, was slurried in n-propanol (100 milliliters). A solution containing *B. subtilis* enzyme mixture (5.0 grams) in water (15 milliliters) was then prepared and combined with the slurry. Thereafter glutaraldehyde (25 weight percent aqueous solution, 2.0 milliliters) was added. The pH of the resulting admixture was observed to be 6.0 to 7.0.

The obtained product was a gummy mass to which 50 milliliters of water was added after two hours in order to "particularize" suspended material. After 5 hours liquid was decanted from the gummy solids and 150 milliliters of water added thereto. pH was maintained at 6.0 to 7.0, the resulting admixture stirred for 72 hours at 4° C., and then centrifuged. The recovered solids were then lyophilized. 5.1 Grams of a product having a protease activity of 8,820 units per gram was obtained.

It is to be understood that the invention is not to be limited to the exact details of operation or exact compounds, compositions, methods, or procedures shown and described, as obvious modifications and equivalents will be apparent to one skilled in the art.

I claim:

1. An insoluble, enzymatically-active composite comprising a siliceous material, an organosilane held on the surface thereof, and an enzyme covalently bound to a crosslinking agent which is covalently bound to said organosilane; said crosslinking agent being a member of the group consisting of an aldehyde selected from the group consisting of formaldehyde, unsaturated monoaldehyde containing up to 4 carbon atoms, inclusive, and dialdehyde; a bispropiolate; and a disulfonyl halide.

2. The composite of claim 1, wherein the organosilane is omega-aminoalkyltrialkoxysilane.

3. The composite of claim 2, wherein the omega-aminoalkyltrialkoxysilane is gamma-aminopropyl trimethoxysilane.

4. The composite of claim 1, wherein the crosslinking agent is formaldehyde.

5. The composite of claim 1, wherein the enzyme is a protease.

6. The composite of claim 1, wherein the siliceous material is silica.

7. The composite of claim 1, wherein the enzyme comprises a mixture of neutral protease, alkaline protease, and amylase.

8. The composite of claim 1, wherein the crosslinking agent is ethylene glycol bispropiolate.

9. The product of claim 1, wherein the siliceous material is calcium silicate.

10. The product of claim 1, wherein the crosslinking agent is glutaraldehyde.

11. The product of claim 1, wherein the enzyme comprises a neutral protease, alkaline protease, and amylase mixture produced by a *Bacillus subtilis* species.

12. Process for the production of an insoluble, enzymatically-active composite comprising the steps of reacting a siliceous material with a hydrolyzable group of an organosilane bearing a functional group and attaching an enzyme having a reactive group not essential for enzymatic activity to the reacted organosilane by reacting said reactive group with a crosslinking agent and reacting said crosslinking agent with the functional group of said organosilane, said crosslinking agent being a member of the group consisting of an aldehyde selected from the group consisting of formaldehyde, unsaturated monoaldehyde containing up to 4 carbon atoms, inclusive, and a dialdehyde; a bispropiolate; and a disulfonyl halide.

13. Process of claim 12, wherein the siliceous material is silica.

14. Process of claim 12, wherein the organosilane is omega-aminoalkyltrialkoxysilane.

15. Process of claim 12, wherein the organosilane is gamma-aminopropyltrimethoxysilane.

16. Process of claim 12, wherein the crosslinking agent is formaldehyde.

17. Process of claim 12, wherein the crosslinking agent is ethylene glycol bispropiolate.

18. Process of claim 12, wherein the crosslinking agent is glutaraldehyde.

19. Process of claim 12, wherein the enzyme comprises a protease.

20. Process of claim 12, wherein the enzyme comprises neutral protease, alkaline protease, and amylase.

21. Process of claim 12, wherein the enzyme comprises a neutral protease, alkaline protease and amylase mixture produced by a *Bacillus subtilis* species.

* * * * *

C-11-21-0135

UNITED STATES PATENT OFFICE
CERTIFICATE OF CORRECTION

Patent No. 3,669,841     Dated June 13, 1972

Inventor(s)  ROBERT E. MILLER

It is certified that error appears in the above-identified patent and that said Letters Patent are hereby corrected as shown below:

PATENT READS:

[56] Other Publications
line 6, "Gross-linking"

line 7, "glutataldehyde"

Col. 3, Line 70
"0.01 - 0.0001/.0"

APPLICATION READS:

Other Publications
----Cross-linking----

----glutaraldehyde----

Page 7, Line 13
----0.01 - 0.0001/1.0----

Signed and sealed this 10th day of October 1972.

(SEAL)
Attest:

EDWARD M. FLETCHER, JR.
Attesting Officer

ROBERT GOTTSCHALK
Commissioner of Patents

FORM PO-1050 (10-69)